United States Patent Office 3,296,339
Patented Jan. 3, 1967

3,296,339
THERMOPLASTIC COMPOSITIONS FORMED BY POLYMERIZING METHACRYLIC ACID ESTERS AND POLYBUTADIENE LATICES
Seymour S. Feuer, Durham, N.H., assignor to Rohm & Haas Company, Philadelphia, Pa., a corporation of Delaware
No Drawing. Filed Jan. 20, 1966, Ser. No. 521,796
7 Claims. (Cl. 260—879)

This application is a continuation-in-part of my copending application, United States Serial No. 637,090 filed January 30, 1957, and now abandoned.

This invention relates to improved thermoplastic compositions particularly characterized by their rigid, tough properties and exceptional ability to retain toughness at low temperatures. More particularly it relates to thermoplastic compositions formed from a polybutadiene latex and a monomeric material solely or preponderantly of methyl methacrylate. The process whereby such compositions are made also constitutes a part of this invention.

Latices of polybutadiene are well-known, commercially available materials. These latices are polymers in a particulate form dispersed in an aqueous medium by means of a dispersing agent. Such polymers have a molecular weight within the range of about 25,000 to 1,500,000 and preferably within the range of about 150,000 to 500,000. Monomeric materials solely or preponderantly of methyl methacrylate are also well known. Monomeric materials utilized in accordance with this invention comprise those containing at least 50% and preferably as much as 85% by weight of methyl methacrylate. Where 100% methyl methacrylate is not used, monomeric mixtures of methyl methacrylate with other compounds copolymerizable therewith, such as ethyl acrylate, acrylonitrile, vinylidene chloride, styrene or similar unsaturated compounds may be employed to produce the novel compositions with which this invention is concerned.

The steps of process whereby the improved compositions of this invention are produced comprise emulsion polymerizing the monomeric methyl methacrylate or mixture of methyl methacrylate and one or more compounds copolymerizable therewith which contain in their structure a single terminally located vinylidene group, with the polybutadiene latex in the presence of a free-radical polymerization initiator and a polymerization regulator which serves as a chain transfer agent at temperatures of the order of 15° C. to 80° C. Any of the well-known free-radical polymerization initiators which polymerize methyl methacrylate per se may be used in the emulsion polymerization. Suitable polymerization initiators are, for example, those of the organic peroxide type, such as methyl ethyl ketone peroxide and benzoyl peroxide, those of the hydroperoxide type, such as cumene hydroperoxide, those of the persulfate type, such as potassium persulfate, or initiators such as azoisobutyronitrile. Thus the usual water-soluble as well as the monomer-soluble types of initiators may be employed. Amounts of initiator used are normally of the order of .05 to .5 part by weight of monomer used. Initiators of the water-soluble type may be added to the diluted latex before the monomer is added, while initiators soluble in the monomer are usually added thereto prior to bringing the monomer into contact with the latex.

Polymerization regulators suitable for use in the process are those organic sulfur compounds such as thio-acids, high molecular weight mercaptans such as benzyl mercaptan, aliphatic mercaptans having at least six carbon atoms per molecule such as octyl, dodecyl and tertiary dodecyl mercaptan, mixtures of mercaptans such as are obtained for example from lauryl alcohol, nitro hydrazines, amino compounds, carbon tetrachloride and similar well-known polymerization modifiers or regulators. Alkyl mercaptans of low water solubility such as n-dodecyl mercaptan or tertiary dodecyl mercaptan are preferred. Amounts of modifier added to control the rate of polymerization may be within the range of about .2 to 5% by weight of monomer used. Addition of the modifier to the monomer prior to admixing the latter with the latex is preferred.

In addition there may be added to the composition, after polymerization, light stabilizers such as methyl or phenyl salicylate, oxidation inhibitors, such as hydroquinone or one of the phenolic or amine type rubber antioxidants, fillers, coloring materials and the like as is well understood in the art.

The latices of polybutadiene normally contain a sufficient amount of dispersing agent such as sodium oleate, sodium lauryl sulfate or the like to maintain the copolymer in suspension in the liquid medium. Prior to addition of the monomer or comonomer to the latex in accordance herewith additional dispersing agent of the same or generally similar type may be added to the latex if desired. Thereafter, the monomer or comonomer, catalyst and polymerization regulator in admixture with the latex is emulsion polymerized in a suitable reactor under controlled temperature conditions. The amount of monomer or comonomer polymerized with the latex in accordance with this invention ranges from 85 to 60 parts by weight of the former to 15 to 40 parts by weight of solids in the latex.

To illustrate the invention more fully, the following examples are given wherein the parts specified are by weight:

Example 1

One hundred parts of a polybutadiene latex formed by emulsion polymerizing 60 parts of butadiene dispersed in 40 parts of water in the presence of an emulsifying agent at a temperature of 65° C., the number average molecular weight of the polymer being of the order of 100,000, was diluted with 140 parts of water containing 1.25 parts of sodium lauryl sulfate dissolved therein. The diluted latex was agitated until homogeneous. The diluted latex described above will hereinafter be described as latex "A." One hundred and fifty parts of methyl methacrylate monomer containing .30 part cumene hydroperoxide and .99 part of n-dodecyl mercaptan were added to 200 parts latex with stirring to obtain a uniform stable emulsion. To the emulsion was added .15 part of sodium sulfoxylate formaldehyde and the emulsion was then placed in an oven maintained at 60° C. for a period of 18 hours. Coagulation of solids was then brought about by slowly pouring the emulsion into 1,000 parts of a 0.5% aqueous solution of calcium chloride containing 1.0 part of 2,6 ditertiary butyl, 4-methyl phenol. Thereafter the coagulated polymer was filtered, washed and dried. The resulting powder was found particularly suitable for extrusion, pelleting and molding. It exhibited good flow characteristics and had high impact strength at both high and low temperatures. In addition, the polymer had high heat distortion temperature. The combination of high heat distortion temperature coupled with very good retention of properties at low temperatures was unexpected and is quite unique among polymers of this type. The actual physical properties of this polymer are listed in Table I under identification of polymer "B."

Example 2

To 200 parts of latex "A" described above were added 142.5 parts of methyl methacrylate, 7.5 parts of acrylonitrile, .15 part of azoisobutyronitrile, .99 part of lauryl mercaptan, with stirring, until a stable emulsion formed. The emulsion was heated at 60° C. for 18 hours after which it was coagulated, washed and dried as in Example 1. The dry powder (polymer C) extruded nicely and when molded showed excellent strength and toughness and retention of good properties over an unusually wide range of temperatures. The actual physical properties are listed in Table I under the designation polymer "C."

*Example 3*

To 200 parts of latex "A" described in Example 1 were added 116.4 parts of methyl methacrylate, 33.6 parts of styrene, .99 part of lauryl mercaptan, .15 part of benzoyl peroxide, and .15 part of sodium sulfoxylate formaldehyde while stirring constantly to form a stable emulsion. The emulsion was polymerized, coagulated, filtered, washed and dried as in Example 1. The resulting powder extruded well and when molded was found to be a hard, tough, clear plastic maintaining its strength properties over an unusually wide range of high and low temperatures. This polymer had a high degree of clarity. The physical properties of this polymer are listed in Table I under polymer "D."

*Example 4*

To 200 parts of latex "A" described in Example 1 were added 104 parts of methyl methacrylate, 28.5 parts of styrene, 7.5 parts of acrylonitrile, .15 part of cumene hydroperoxide, .15 part sodium sulfoxylate formaldehyde, and .66 part of lauryl mercaptan while stirring constantly to form a stable emulsion. The emulsion was polymerized, coagulated, filtered, washed and dried as in Example 1. The resulting powder extruded well and when molded was found to be a hard, tough, clear plastic maintaining its strength properties over an unusually wide range of high and low temperatures. This polymer had a high degree of clarity. The physical properties of this polymer are listed in Table I under polymer "E."

*Example 5*

Fifty parts of methyl methacrylate monomer containing .10 part cumene hydroperoxide and .33 part of lauryl mercaptan were added to 200 parts of latex "A" with stirring to obtain a uniform, stable emulsion. To this emulsion was added .05 part of sodium sulfoxylate formaldehyde and the emulsion was then placed in an oven maintained at 60° C. for a period of 18 hours. Coagulation of solids was then brought about by slowly pouring the emulsion into 1,000 parts of a 0.5% aqueous solution of calcium chloride containing 1.0 part of 2,6 ditertiary butyl, 4-methyl phenol. Thereafter the coagulated polymer was filtered, washed and dried. The resulting powder was found particularly suitable for extrusion, pelleting and molding. It exhibited good flow characteristics and had high impact strength at both high and low temperatures. In addition, the polymer had a high heat distortion temperature. The combination of high heat distortion temperature coupled with very good retention of properties at low temperatures was unexpected and is quite unique among polymers of this type. The actual physical properties of this polymer are listed in Table I under identification of polymer. "F."

*Example 6*

To 200 parts of latex "A" described in Example 1 were added 38.2 parts of methyl methacrylate, 11.8 parts of styrene, .10 part of cumene hydroperoxide, 0.5 part of sodium sulfoxylate formaldehyde and .33 part of lauryl mercaptan while stirring constantly to form a stable emulsion. The emulsion was polymerized, coagulated, filtered, washed and dried as in Example 1. The resulting powder extruded well and when molded was found to be a hard, tough plastic maintaining its strength properties over an unusually wide range of high and low temperatures. The physical properties of this polymer are listed in Table I under polymer "G."

TABLE I

| Property | Units | Polymer Designation | | | | | |
|---|---|---|---|---|---|---|---|
| | | B | C | D | E | F | G |
| Clarity | | T.L. | T.L. | C.L. | C.L. | T.L. | T.L. |
| Izod Notched Impact Strength | +23° C. ft.-lbs./inch −25° C. | 1.5 .9 | 2.8 1.7 | 3.5 1.8 | 2.3 1.0 | 3.8 3.4 | 5.9 4.9 |
| Rockwell L Hardness | | 59.5 | 49.5 | 35 | 43 | −41 | −52 |
| Heat Distortion Temperature | ° C. | 103 | 96 | 96 | 90 | 93 | 87 |
| Flexural Strength | P.s.i. | 8,500 | 8,000 | 7,100 | 7,200 | | |

NOTE.—C.L.=Clear, T.L.=Translucent.

I claim:

1. A rigid, tough, solid thermoplastic composition comprising 85 to 60 parts by weight of a member of the group consisting of methyl methacrylate solely and mixtures of at least 50% by weight of methyl methacrylate with another monomer having a single vinylidene group as the sole polymerizably reactive group polymerized while in intimate contact with 15 to 40 parts by weight of a butadiene homopolymer.

2. A rigid, tough, solid thermoplastic composition comprising 85 to 60 parts by weight of a mixture of at least 50% by weight of methyl methacrylate with another monomer having a single vinylidene group as the sole polymerizable reactive group polymerized while in intimate contact with 15 to 40 parts by weight of a butadiene homopolymer.

3. A rigid, tough, solid thermoplastic composition comprising 85 to 60 parts by weight of methyl methacrylate polymerized while in intimate contact with 15 to 40 parts by weight of a butadiene homopolymer.

4. A method of producing a rigid, tough, solid thermoplastic composition which comprises polymerizing in emulsion 85 to 60 parts by weight of a member of the group consisting of methyl methacrylate solely and mixtures of at least 50% by weight of methyl methacrylate with another monomer having a single vinylidene group as the sole polymerizably reactive group while in intimate contact with 15 to 40 parts by weight of a butadiene homopolymer in latex form, the emulsion polymerization being carried out in the presence of a free-radical polymerization initiator and a polymerization regulator which serves as a chain transfer agent at a temperature of about 15° C. to about 80° C.

5. A method of producing a rigid, tough, solid thermoplastic composition which comprises polymerizing in emulsion 85 to 60 parts by weight of a mixture of at least 50% by weight of methyl methacrylate with another monomer having a single vinylidene group as the sole polymerizably reactive group while in intimate contact with 15 to 40 parts by weight of a butadiene homopolymer in latex form, the emulsion polymerization being carried out in the presence of a free-radical polymerization initiator and a polymerization regulator which serves as a chain transfer agent at a temperature of about 15° C. to about 80° C.

6. A method of producing a rigid, tough, solid thermoplastic composition which comprises polymerizing in emulsion 85 to 60 parts by weight of methyl methacrylate while in intimate contact with 15 to 40 parts by weight of a butadiene homopolymer in latex form, the emulsion polymerization being carried out in the presence of a free-radical polymerization initiator and a polymerization regulator which serves as a chain transfer agent at a temperature of about 15° C. to about 80° C.

7. A composition obtained by polymerizing from 60 to 66⅔ parts by weight of a polymerizable mixture consisting of methyl methacrylate and styrene while in intimate contact with, correspondingly, from 40 to 33⅓ parts by weight of a butadiene homopolymer, said polymerizable mixture containing at least 50% by weight of methyl methacrylate.

References Cited by the Examiner
UNITED STATES PATENTS

| | | | |
|---|---|---|---|
| 2,356,091 | 8/1944 | Roedel | 260—879 |
| 2,422,550 | 6/1947 | Jacobson | 260—4 |
| 2,512,697 | 6/1950 | Te Grotenhuis | 260—879 |
| 2,614,093 | 10/1952 | Wheelock | 260—888 |
| 2,694,692 | 11/1954 | Amos et al. | 260—4 |
| 2,755,270 | 7/1956 | Hayes | 260—880 |
| 2,785,143 | 3/1957 | Edgerley | 260—83.5 |
| 2,857,360 | 10/1958 | Feuer | 260—880 |

FOREIGN PATENTS

| | | |
|---|---|---|
| 888,775 | 9/1943 | France. |
| 679,562 | 9/1952 | Great Britain. |

OTHER REFERENCES

Whitby, Ind. Eng. Chem., vol. 47, pages 806–820, especially pp. 815–816, April 1955.

MURRAY TILLMAN, *Primary Examiner.*

G. LESMES, *Assistant Examiner.*